April 2, 1963        H. A. ENGE        3,084,249
MAGNETIC SPECTROMETER WITH A FOCUSING LENS SYSTEM
PRIOR TO THE ENERGY SEPARATION MEANS
Filed Oct. 1, 1959        3 Sheets-Sheet 3
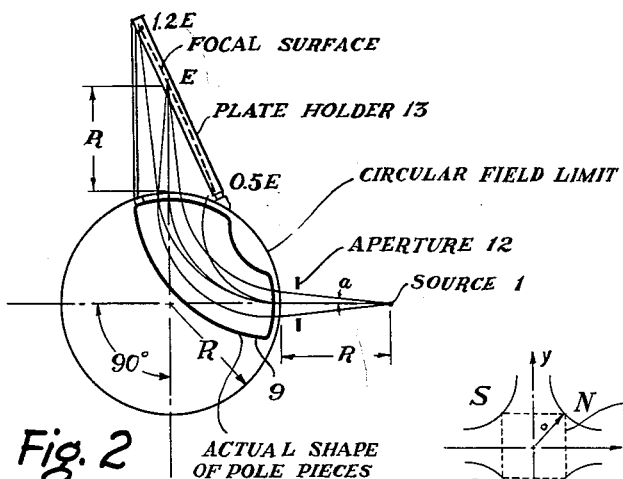
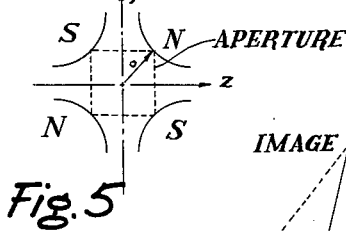
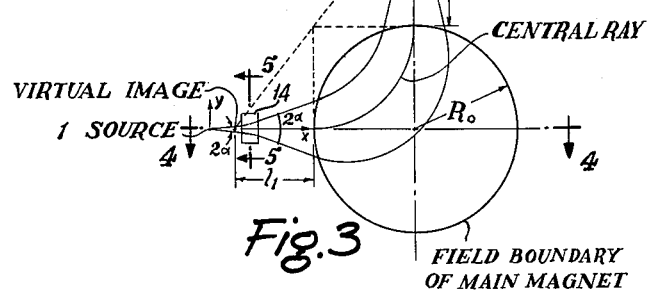
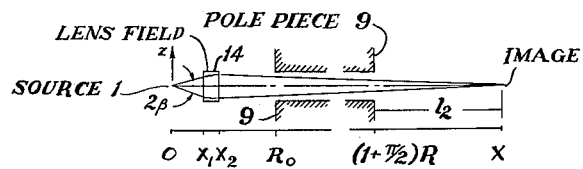
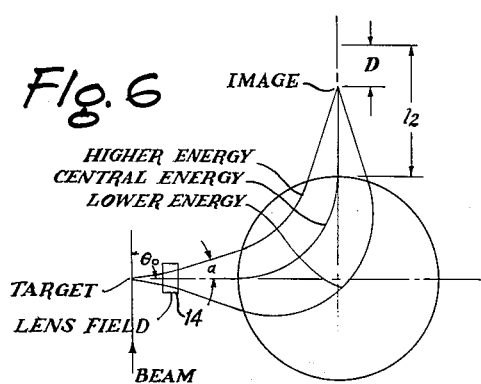

United States Patent Office 3,084,249
Patented Apr. 2, 1963

3,084,249
MAGNETIC SPECTROMETER WITH A FOCUSING
LENS SYSTEM PRIOR TO THE ENERGY SEPA-
RATION MEANS
Harald A. Enge, Winchester, Mass., assignor to High
Voltage Engineering Corporation, Burlington, Mass., a
corporation of Massachusetts
Filed Oct. 1, 1959, Ser. No. 843,767
3 Claims. (Cl. 250—41.9)

This invention relates to spectroscopy of the type wherein corpuscular radiation of heterogeneous energy is analyzed by an energy separating magnet which serves to spread out in space particles having different energy. The energy spectrum may then be measured either by photographic methods or by counting methods. In a magnetic spectrograph photographic methods are employed and the entire range produced by the magnet is recorded on a photographic film or plate with one exposure. The photographic image is then examined under a microscope and the number of tracks made by the incident particles is counted by eye. Since the entire energy range of the magnet is thus recorded with one exposure, one can tolerate a small aperture and a small concentrated target spot, each of which has the advantage of providing very high resolution. Accordingly magnetic spectrographs have been designed having a broad energy range, and a small aperture, so that when operated with a small concentrated target spot, very high resolution is provided. In order to obtain very high resolution the small aperture is required due to the fact that the magnetic air gap must be small in order to reduce the fringing fields, and thereby provide as uniform a magnetic field as possible.

While the small aperture which is required in order to obtain high resolution can be tolerated in the case of the spectrograph which simultaneously records a great deal of information, such a small aperture becomes a difficulty when the device is used as a single channel spectrometer wherein particles with very nearly the same energy pass through a slot system and fall upon a detector. The difficulty resides in the fact that for comparable resolution it is necessary to have the same exposure time as before, but in this case a minute amount of information is received.

My invention comprehends the combination of a high-resolution, small-aperture energy-separating magnet with a strong focusing lens such as a quadrupole lens or a sector lens, the strong focusing lens serving to increase the effective aperture by collecting particles over a larger solid angle and directing them into the narrow gap.

In general, the type of energy separating magnet with which the invention is concerned is used for studies of nuclear physics in the binding energy range. In such studies a target material whose composition is known accurately is bombarded by a beam of charged particles, and the energies and intensities of the charged products from the nuclear reactions in the target are measured. In this way a graph of intensity of the charged products of the nuclear reactions as a function of their energy may be obtained. Such a graph could be obtained by measuring the reaction products with an ordinary scintillation counter equipped with appropriate gating circuits to measure over only a certain small energy range. Of course, the smaller the energy range over which this measurement is taken the higher the resolution and the more accurate the information obtained. The mean energy of this energy range divided by the width at half maximum intensity is the resolving power or resolution of the counting device. With a scintillation counter, the maximum resolution possible has been of the order of 50 to 100. The magnetic spectrograph on the other hand is capable of giving resolutions of the order of 1000.

Despite the markedly greater exposure time involved, some experimenters prefer the spectrometer to the spectrograph since it is not necessary to examine photographic images under a microscope. Moreover, for certain applications the spectrometer is necessary as, for example, in coincidence studies where one is interested in recording the simultaneous or virtually simultaneous occurrence of the reaction measured by the spectrometer and a following reaction which is measured by another counter. For example, bombardment of a nucleus of the target may result in a transmutation which leaves the residual nucleus in an excited state which very shortly thereafter decays with the emission of a gamma ray. One then wishes to record the virtually simultaneous emission of the emitted particle and the gamma ray subsequently emitted. Because of the nature of the apparatus employed, events which are separated by less than, say a few millimicroseconds are recorded as simultaneous events.

In addition to the foregoing, the device is also useful in scattering mass spectroscopy wherein elastic scattering is employed for mass measurement. In such experiments a target is bombarded by an artifically accelerated beam of charged particles whose energy is known, and the energy of these particles after they have been scattered through a given angle in a collision with a target nucleus is measured. Depending on the mass of the nuclei in the target with which the incident particles have collided the energy of the recoils will vary. If in such experiments one were to be looking for a specific element, one would select the use of a spectrometer rather than a spectrograph since one could concentrate on the expected recoil energy.

Especially for the transmutation type experiments, measurements are usually made at various angles with respect to the incident beam of charged particles in a plane which includes the incident beam. Generally it is convenient to select this plane as a horizontal plane with a horizontal incident beam since in this way the magnetic spectrograph or spectrometer may be moved about the target more readily. In the case of the magnetic spectrograph the particles which are emitted into the aperture of the instrument are deflected by a magnetic field which is so constructed that particles having different energies will be focused at different points. A photographic plate is positioned along the locus of these focal points and a picture is obtained showing the energy spectrum of the particles emitted at that angle. A spectrometer operates in a similar manner except that instead of taking a picture of the entire locus of the focal points, a suitable counting device observes the intensity at one of these focal points. The spectrograph provides a great deal of information in one exposure, and it is not of great importance to have a large aperture. Accordingly spectrographs have been designed which will record simultaneously a wide range of energies. See, for example, the article by Browne and Buechner in The Review of Scientific Instruments, vol. 27, pp. 899–907.

Such a magnetic spectrograph, however, is generally unsuited for use as a spectrometer because of its small aperture.

In accordance with the teachings of the invention a device having the characteristic small aperture of the broad range magnetic spectrograph may be simply converted to a device useful as a spectrometer merely by the addition of a strong-focusing lens such as a single quadrupole magnetic lens or a sector lens. The invention is useful with any type spectrograph or spectrometer magnet.

The construction of magnetic spectrographs is well known and need not be gone into in detail herein. As an example, reference is made to the above cited article by Browne and Buechner. In general a magnetic field of certain precise configuration is provided by a magnet having pole pieces between which the charged particles pass. A target is bombarded by an artificially accelerated beam of charged particles and the entrance aperture of the magnetic spectrograph is positioned such that a small portion of the particles emitted from the target is admitted into the vacuum chamber between the pole pieces. The magnetic field then deflects these charged particles—differently for the different energies—with the result that they are spread out into a sheet which is permitted to impinge upon a photographic plate positioned along the focal surface.

In accordance with the invention, there is provided with such a magnetic spectrograph a single quadrupole or sector lens close to the target adapted to convert the spectrograph from a "single focusing" instrument to a double focusing instrument. The result is that a larger solid angle is subtended around the target.

The invention may best be understood from the following detailed description thereof having reference to the accompanying drawing, in which:

FIG. 2 is a diagram showing the deflecting action of the main magnet of the apparatus of FIG. 1;

FIG. 3 is a diagram similar to that of FIG. 2 showing the added effect of a quadrupole lens;

FIG. 4 is a view along the line 4—4 of FIG. 3;

FIG. 5 is a view along the line 5—5 of FIG. 3; and

FIG. 6 is a diagram similar to that of FIG. 3 showing image displacement caused by angle dependence of emitted particle energy.

Figure 1:
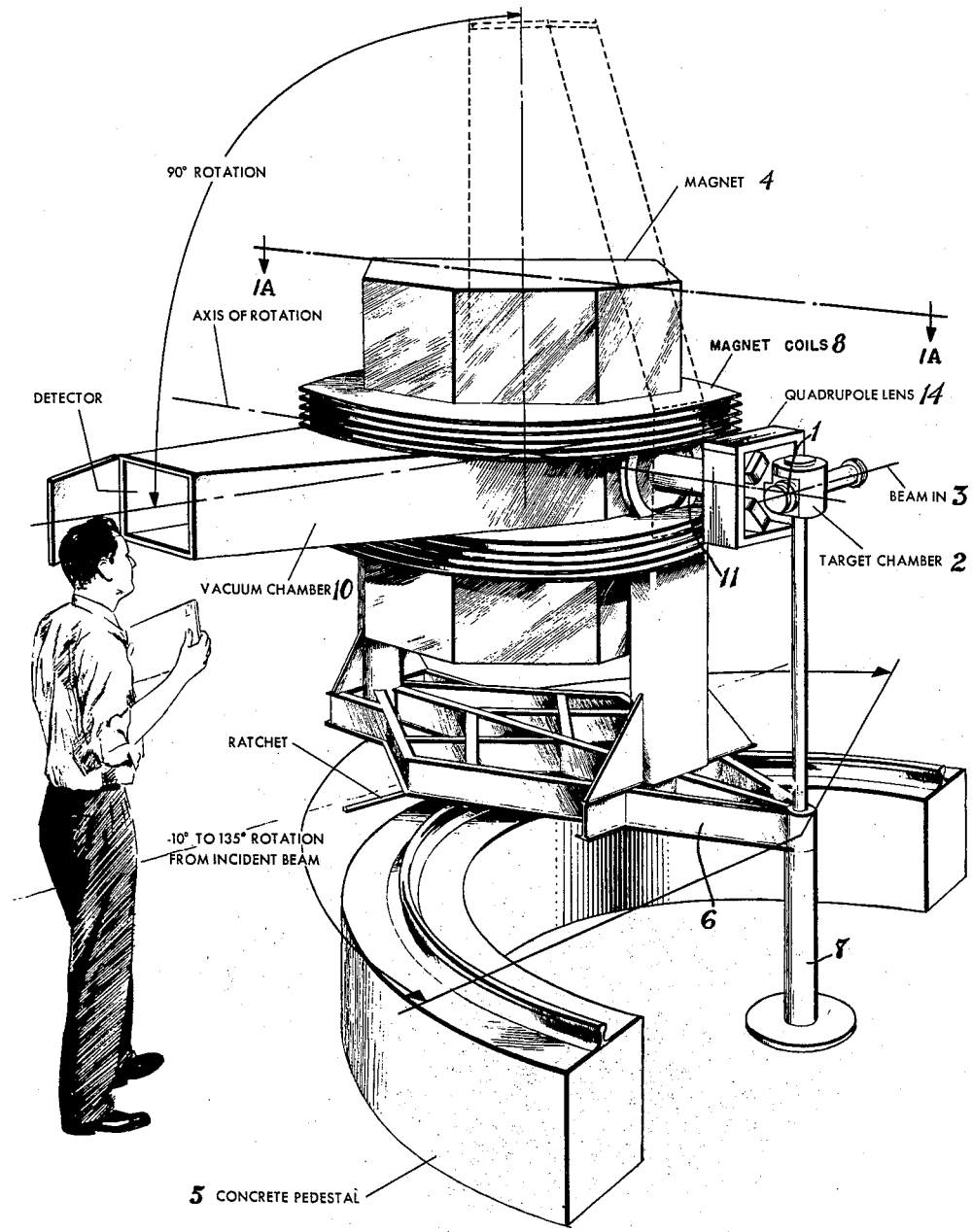
FIG. 1 is a perspective view of a combined magnetic spectrograph and spectrometer constructed in accordance with the invention.
Figure 1A:
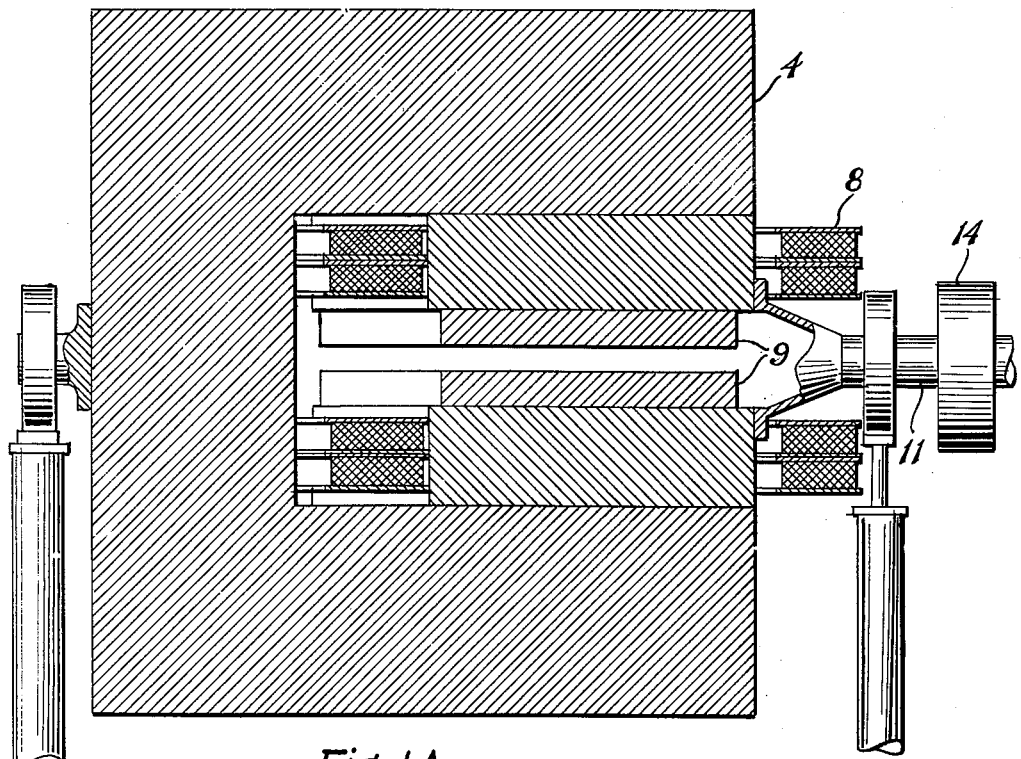
FIG. 1A is a sectional view along the line 1A—1A of FIG. 1.
Figure 1B:
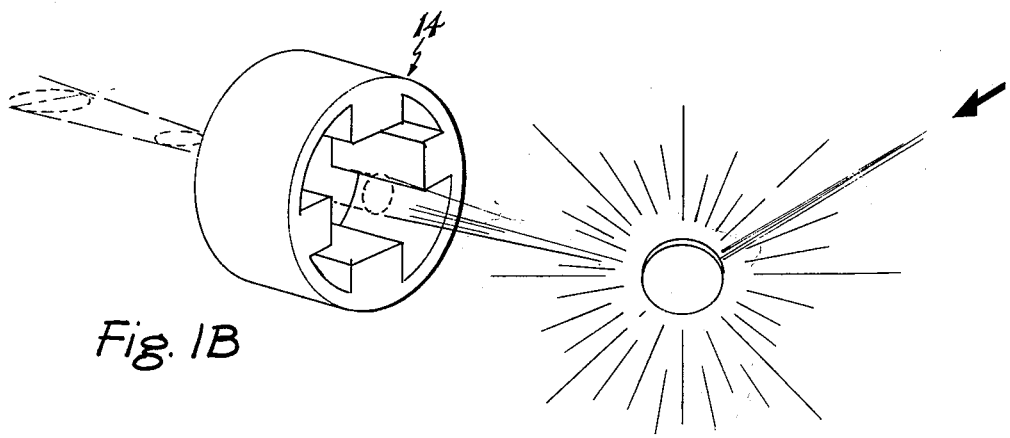
FIG. 1B is a somewhat diagrammatic view showing how the quadrupole lens 14 of FIG. 1 cooperates with certain of the ions from the target 1 shown in FIG. 1.

Referring to the drawings and first to FIGS. 1 and 2 thereof, a target 1 comprising film of known composition is mounted in a target chamber 2 and bombarded by a beam 3 of charged particles. For example, the target 1 may comprise $Al^{27}$ and the beam of charged particles may be a beam of 6 m.e.v. deuterons. Bombardment of the target 1 results in nuclear reactions from which both corpuscular and electromagnetic radiation is emitted in all directions from the target 1. For example, bombardment of $Al^{27}$ by deuterons may result in the combination of the neutron of a deuteron with the nucleus of an $Al^{27}$ atom so as to form $Al^{28}$ while the proton of the deuteron is emitted. Applications of the laws of conservation of energy and conservation of momentum to the reaction result in the following well-known equation:

$$Q=T_e\left(1+\frac{m_e}{m_r}\right)-T_i\left(1-\frac{m_i}{m_r}\right)-\frac{2\sqrt{m_e T_e m_i T_i}}{m_r}\cos\theta \quad (1)$$

where Q represents the energy released at the expense of the total rest energy of the system, T represents kinetic energy, $m$ represents mass, the subscripts $i$, $e$ and $r$ refer to the incident particle, the emitted particle, and the residual nucleus respectively, and $\theta$ is the reaction angle (angle between the directions of the incident and emitted particles). Of these quantities, the characteristics of the bombarded nucleus and of the bombarding charged particles are known precisely so that the energy Q may be ascertained by measurement of the energy of the emitted proton. For a given reaction, such as the $Al^{27}(d,p)Al^{28}$ reaction, the value of Q will not be the same for each event since the $Al^{28}$ may be left either in the ground state or in an excited state. For each state of the reaction nucleus, therefore, there will be a corresponding value of Q and hence a corresponding energy of the emitted proton. Measurement of the energy spectrum of the emitted particles therefore gives information as to the various energy levels in the reaction nucleus. It is apparent from the above equation that for a given value of Q the energy of the emitted particle, $T_e$ is a function of the reaction angle. To obtain good resolving power one therefore has to limit the range $\Delta\theta$ of the reaction angle accepted by the aperture of the instrument. As will be pointed out hereinafter, means may be provided to make a correction for energy deviations due to the finite range of reaction angle accepted during one exposure.

The energy separating magnet 4 is supported on a concrete pedestal 5 in the vicinity of the target chamber 2. In order to take measurements at various reaction angles, the magnet 4 is rotatable about the target chamber 2 as an axis. Owing to the weight of the magnet 4, it is designed to rotate in a horizontal plane, an arm 6 being provided to insure that the magnet 4 pivots about the stand 7 upon which the target chamber 2 is supported. The magnet 4 itself is energized by magnet coils 8, and the actual pole faces 9 of the magnet are enclosed within a vacuum chamber 10 which in turn is connected by a length of vacuum plumbing 11 to the target chamber 2. An aperture 12 at the entrance of the magnet selects only a portion of the charged particles emitted from the target 1 and these particles entering the vacuum chamber are deflected by the magnetic field before they impinge upon the detector which may either comprise a photographic plate 13 or a counting device.

The operation of the magnet 4 is shown in the diagram of FIG. 2. In the type of energy separating magnet therein shown the theory of operation is based on a uniform magnetic field of circular configuration but unnecessary portions of the circular field are eliminated. As shown in FIG. 2, the boundaries of the pole faces 9 in the vicinity of the charged particles being focused lie in a common cylindrical surface. Such a magnetic field focuses the particles emitted from the target 1 to lines perpendicular to the median plane (a plane parallel to the pole faces). The positions of focal lines differ depending upon the energy of the charged particles. In the type of magnet shown the focal lines lie along a hyperbolic surface which, however, approximates a plane. When used as a spectograph the photographic plate 13 is placed along the locus of the focal lines. When used as a spectrometer the slot system preceding the scintillation crystal or other counting device is positioned at any convenient place along the locus of the focal lines.

In order to obtain high resolution, as previously noted, the magnetic field should be uniform and fringing fields should be uniform and fringing fields should be minimized so that the pole faces 9 of the magnet 4 should be quite close together. This limits the aperture angle in the plane perpendicular to the median plane (a plane parallel to the pole faces). In accordance with the invention, this aperture is greatly increased by the provision of a strong focusing magnet 14 in the vicinity of the target chamber 2. Because in the median plane the lens is diverging, the acceptable aperture angle in this plane is cut down by approximately a factor 2 by the action of the lens. The net gain in solid angle, however, is appreciable. Because of the fact that for constant reaction energy Q, the energy $T_e$ of the emitted particle is a function of the reaction angle $\theta$, it is desirable to orient the instrument so that the smallest aperture angle is in the plane in which the reaction angle lies. Accordingly, when used as a spectrograph without the lens in action, the magnet should be mounted with the median plane vertical, since the reaction angle is in the horizontal plane. When the lens is in operation, however, depending upon the details of the arrangement, the smallest aperture angle may be in the median plane; consequently the median plane should be horizontal. Moreover, if the median plane is horizontal, means may be provided to correct for the reaction-angle dependence of the energy $T_e$ as hereinafter described.

Referring now to the diagrams of FIGS. 3, 4, and 5, the principles of operation of the invention will be described with regard to a single quadrupole lens.

Focusing Conditions

The action of the quadrupole lens in collecting particles and passing them into the spectrograph is demonstrated in FIGS. 3, 4 and 5. In the following, the results of computations on the focusing conditions of the two-magnet combination are given. It is assumed that a stigmatic image of the source is wanted on the recorder.

The components of magnetic induction in the lens are $$B_z = -\frac{B_1}{a} y, \quad B_y = -\frac{B_1}{a} z$$

where $B_1$ is the induction at the pole tips of the lens and $a$ is the distance from centerline to pole tip. Inside the lens field, the equations of motion for a charged particle are $$m\frac{d^2z}{dt^2} = -\frac{B_1}{a} zqv$$

$$m\frac{d^2y}{dt^2} = \frac{B_1}{a} yqv \quad (2)$$

The particles recorded in the spectrometer have a velocity given by $$v = qB_0R_0/M$$

where $R_0$ is the radius of the trajectory and $B_0$ is the induction in the gap of the main magnet. By substituting this and $x=v_x t$ into Equations 2 and also by making the approximation $v_x \approx v$, one obtains the solution for the trajectory of a particle inside the quadrupole magnet, $$z = Z \sin K(x - \lambda_1)$$
$$y = Y \cosh K(x - \lambda_2) \quad (3)$$

where $$K = (B_1/B_0 a R_0)^{1/2} \quad (4)$$

The objective now is to find relationships between the lens strength (value of K) and the geometrical dimensions such that the lens and the main magnet together form a stigmatic image of the source. At the same time, something like an optimum of solid angle for reasonable air gaps is desirable. It is obvious that, for given magnet gaps, the largest solid angle is obtained by making $x_1$ (FIG. 5) small and K large. These quantities can therefore be fixed by practical limitations (space and magnetic saturation). The two dimensions to be fixed by focusing conditions are then $x_2$ defining the lens exit and $l_2$ the image distance. Boundary conditions at $x = x_1$ give $$\lambda_1 = x_1 - (1/K) \tan^{-1} Kx_1$$
$$\lambda_2 = x_1 - (1/K) \coth^{-1} Kx_1 \quad (5)$$

Boundary conditions at $x = x_2$ give for the z direction $$(1/K) \tan K(x_2 - \lambda_1) = -[X - x_2] \quad (6)$$

where $X = R_0(1 + \pi/2) + l_2$ is the object-image distance. Equation 6 is derived on the basis that the main magnet has no focusing action in the z direction (normal entrance and exit) so that the image is formed by the quadrupole lens alone.

For the y direction, the lens forms a virtual image at a distance from the magnet given by $$l_1 = R_0 - x_2 + \frac{1}{K} \coth K(x_2 - \lambda_2) \quad (7)$$

The spectrograph, therefore, forms a real image at a distance $l_2$ from the field boundary, where $$l_2 = \frac{R_0^2}{l_1} \quad (8)$$

From Equations 6–8, $x_2$ and $l_2$ can be determined.

In practice, of course, the lens field does not have sharp cutoffs at $x_1$ and $x_2$, and the effect of the fringing field is difficult to compute. The lens has to be made shorter than that determined from these calculations. The best focusing conditions can then be found by varying the ratio between the lens ampere-turns and main magnet ampere-turns (vary K) to obtain focusing in the z direction at the computed image position. Only small variations of $l_2$ should then be needed to find the position for best focusing in the y direction (the important direction for high resolution).

*Example.*—With $a = 0.03R_0$, $B_1/B_0 = 0.65$ (see Sec. III), and $x_1 = 0.3R_0$, one gets $K = 4.66/R_0$, $x_2 = 0.447R_0$, and $l_2 = 1.27R_0$. For a main magnet with radius $R_0 = 50$ cm., for instance, the theoretical lens length is $x_2 - x_1 = 7.35$ cm., and the gap parameter is $a = 1.5$ cm. The image for this case is 13.5 cm. farther away from the magnet than without a lens.

Solid Angle

Assuming that the maximum allowable excursions for a particle in the y and z directions inside the lens are $a/\sqrt{2}$, the solid angle for accepting particles is $$\Omega \approx 4 \tan \alpha_0 \tan \beta = 2a^2 K^2 \cos K (x_1 - \lambda_1) \frac{\sinh K(x_1 - \lambda_2)}{\cosh K(x_2 - \lambda_2)}$$

For practical examples, this will be of the order of magnitude $$\Omega \approx 0.4 \text{ to } 0.7 a^2 K^2 = 0.4 \text{ to } 0.7 a B_1/R_0 B_0$$

For convenience, the coils of the two magnets could be energized from the same power supply (series connection). The induction ratio $B_1/B_0$ should be chosen so that the hysteresis loops of the two magnets track reasonably well together. This consideration fixes the induction ratio to approximately $B_1/B_0 \approx 0.6$ to 0.7 for a practical design.

A spectrometer with parameters as quoted under the example will have a solid angle $\Omega = 0.90 \times 10^{-2}$ steradian. (With $x_1 = 0.2R_0$, the solid angle would be $\Omega = 1.4 \times 10^{-2}$ steradian.) In order to accept the particles emitted from the source within this solid angle, the free air gap of the main magnet should be of the order $a\sqrt{2} = 0.042R_0$ (or 2.1 cm. for $R_0 = 50$ cm). In the y direction, the main magnet must accept particles, within an angle $\pm \alpha$.

For the example previously mentioned, the angle $\alpha$ is 0.09 radian. This is still compatible with a resolving power of 1 part in 100 for the circular boundary main magnet. For a discussion on loss of resolving power because of lens errors, see the following.

The solid angle for a single-focusing 90-degree spectrometer with $R_0 = 50$ cm., allowable image breadth 2.1 cm. and $\alpha = 0.09$ radian is $2.1 \times 10^{-3}$ steradian. The gain in solid angle with lens is therefore approximately a factor of 4.3 for the example chosen. An additional attractive feature is the magnification smaller than unity in the y direction, as computed in the next section.

Magnification and Distortion

The image formed by the two-magnet combination will be magnified in the z direction by a factor considerably larger than unit. In the more important direction, the y direction, the magnification is smaller than unity; hence, for a given resolving power aimed for, one can allow a larger y dimension of the source than without the lens. Convenient expressions for the magnification are $$M_z = (X - x_2)K \sin K(x_2 - x_1) - \cos K(x_2 - x_1) \quad (10)$$

$$M_y = \frac{l_2/R}{\cosh K(x_2 - x_1) + x_1 K \sinh K(x_2 - x_1)} \quad (11)$$

For the example quoted above, the magnifications are $M_z = 9.3$ and $M_y = 0.56$. A 2 x 2-mm. source gives a 18.6 x 1.12-mm. image. The magnification smaller than unity in the y direction is an advantage, because one can use a larger y dimension of the source for a given resolving power than otherwise would be the case. Also, the beam position in the $y$ direction does not affect the spectrometer calibration to such an extent as it does on a symmetric $M_y = 1$ spectrometer. The large magnification in the $z$ direction is unwanted but not detrimental when one uses a scintillation counter recorder. On a nuclear-track plate recorder, one actually wants the exposed area somewhat spread out in order not to get too high track density.

Lens inaccuracies will of course cause image distortion with loss of resolving power resulting from errors in $y$ deflection and loss or uncertainty of solid angle resulting from errors in $z$ deflection. The result of an estimate with the parameters quoted in the example indicates that a 7% error in deflection angle $(\alpha - \alpha_0)$ for a particle moving close to the $y$ limit of the lens opening throws this particle off by 1 part in 1000 in the recorded energy spectrum. In the $z$ direction, a 7% error in deflection for the extreme orbit (angle $\beta$) will throw this particle off by about 6 mm. (parameters previously given, including $R_0 = 50$ cm.). If the 7% error at maximum angle $\beta$ is the effect of a quadratic term in the expression for $B_y$ versus $z$, the error can be reduced by almost a factor of 6 by subtracting an appropriate amount of the linear term. In practice, it will be convenient to have a shutter that can be made to cover the central portion of the recorder (scintillation counter). The fringes in the $z$ direction of a line can then be minimized by fine adjustment of the lens ampere-turns. As previously indicated, quite large adjustments can be tolerated without impairing the resolving power because of errors in $y$ deflection.

Reaction Angle Correction

The energy of the emitted particle in a nuclear reaction depends to some extent upon the angle $\theta$ between the directions of incident and emitted particles. This fact inhibits the use of large opening angles in the $\theta$ direction for high-resolution spectrometers unless proper corrections are introduced. It appears to be fairly simple for the present type spectrometer to introduce such corrections. FIGURE 6 shows, in principle, how it can be done with a "horizontal" spectrometer (beam direction in median plane of spectrometer). The mean reaction angle $\theta_0$ is in the example 90 degrees. Particles emitted in the forward direction have higher energies; particles emitted at larger angles $\theta$ have lower energies. Because the higher energy particles have larger radii of curvature, they will be deflected less and cross the central ray closer to the magnet than the image point calculated above ($l_2$). The lower energy particles emitted at larger angles $\theta$ will have smaller radii curvature and therefore also cross the central ray closer to the magnet (see FIG. 6). The result is an image displacement on the centerline in direction of the magnet. Results of first-order calculations on this image displacement follow.

The relative shift in energy of emitted particles for a small change in reaction angle around $\theta_0$ is found by differentiating the Q-value equation[3] with respect to $\theta$, keeping the Q value and the incident energy constant. The result is $$\frac{1}{E_{E_0}}\left(\frac{\Delta E_E}{\Delta \theta}\right)_0 = -\frac{2A \sin \theta_0}{1 - A \cos \theta_0} \quad (12)$$

where $$A = (M_I M_E E_I / E_{E_0}) / M_R + M_E) \quad (13)$$

Subscripts I, E, and R refer to incident, emitted, and residual particles, and subscript 0 refers to the central ray.

The quadrupole lens amplifiers the angular deviation $\Delta \theta$ with a factor $$\frac{\Delta \alpha}{\Delta \theta} = -\frac{\sinh K(x_2 - \lambda_2)}{\sinh K(x_1 - \lambda_2)}$$

The change in radius of curvature for a given change in energy is given by $\Delta E_E / E_{E_0} = 2\Delta R / R_0$. From the assimilation of this information, a starting point for the geometrical calculations on image displacement is provided by the factor.

$$k = \frac{1}{R_0}\frac{\Delta R}{\Delta \alpha} = \frac{1}{2}\frac{\Delta \theta}{\Delta \alpha}\frac{1}{E_{E_0}}\frac{\Delta E_E}{\Delta \theta}$$

$$= \frac{\sinh K(x_1 - \lambda_2)}{\sinh K(x_2 - \lambda_2)} \frac{A \sin \theta_0}{1 - A \cos \theta_0} \quad (14)$$

Simple first-order geometrical calculations on the focusing properties of the main magnet yield for the image displacement $$D = \frac{R_0^2}{l_1} \frac{1 + R_0/l_1}{1 + kR_0/l_1} k \quad (15)$$

The last factor in the equation for $k$ depends upon reaction type, angle, and energies. The position is not extremely critical, partly because the energy of emitted particles appears in the formula under the square root sign, so that at least for reactions on heavier nuclei where the displacement is small, the recorder can remain in the same position for a fair portion of the spectrum of emitted energies.

It should be noted that, in a spectrum taken with the correct recorder slit position for a given reaction, the peaks from other contaminant isotopes in the target will appear broader e.g., $C^{12}(d, p)C^{13}$ on all targets. This is an advantage in one respect because it will help to identify these peaks. In another respect, it is at the same time disadvantageous because the sometimes very intense contaminant peaks will obscure large portions of the spectrum.

In the $z$ direction, the focus will still be at a distance $l_2$ from the magnet. Hence, the displaced image is not stigmatic, but of course all particles with the right energy that pass through the main magnet can be collected on the recorder even if this is not placed at the correct position for $z$ focusing.

*Examples.*—For the $K^{39}(d, p)K^{40}$ reaction at $\theta_0 = 90°$, $E_I = 5$ m.e.v., $E_E = 10.1$ m.e.v. (ground state), and other parameters as already given, the image displacement calculated from Equation 14 is $D = 310 \times 10^{-2} R_0$ (1.55 cm. for $R_0 = 50$ cm.).

For the $C^{12}(d, \alpha)B^{10}$ reaction at $\theta_0 = 90°$, $E_I = 5$ m.e.v., and $E_E = 3.7$ m.e.v. (ground state), the image displacement under the same circumstances is $D = 0.259 R_0$ (12.95 cm. for $R_0 = 50$ cm.).

The instrument here proposed can be used as a regular broad-range spectrograph with the current to the quadrupole lens switched off. Because in this case the acceptance angle in the $x-z$ plane is much smaller than in the $x-y$ plane, the beam should preferably be in the $x-z$ plane.

A convertible instrument could be mounted such that it can rotate 90 degrees around the $x$ axis. For horizontal beam direction, the median plane of the main magnet should be vertical for spectrograph application and horizontal for spectrometer application.

For a more detailed description of a quadrupole lens, which has now become well known in the art, reference is made to an article entitled "High Focusing Properties of a Quadrupole Lens Pair" in the Review of Scientific Instruments, volume 30, pages 248-251. A sector lens may be defined as a uniform magnetic field in the path of the charged particle beam and transverse thereto, the boundaries through which said charged particles enter and leave said magnetic field being straight lines at an angle to each other so that the shape of the magnetic field in general is that of a sector; a sector lens exhibits properties quite similar to those of a single quadrupole lens.

Having thus described the principles of the invention

I claim:

1. A high-intensity magnetic energy-spectrum measuring device comprising, in combination with a source of charged particles whose energy spectrum is to be measured, an energy separating magnet having pole faces separated by a gap, said pole faces having boundaries which lie in a common cylindrical surface in the vicinity of the charged particles being focused such that charged particles entering said gap from a given origin are focused at a focal line the position of which is a function of the energy of the charged particles, and a single strong-focusing lens supported between said source and said energy separating magnet, whereby the solid angle of acceptance of the charged particles entering into said energy separating magnet is increased without altering the features of said energy separating magnet other than displacing its focal surface, and detection means on at least part of said focal line.

2. A high-intensity magnetic energy-spectrum measuring device comprising, in combination with a source of charged particles whose energy spectrum is to be measured, an energy separating magnet having pole faces separated by a gap, said pole faces having boundaries which lie in a common cylindrical surface in the vicinity of the charged particles being focused such that charged particles entering said gap from a given origin are focused at a focal line the position of which is a function of the energy of the charged particles, and a single quadrupole lens supported between said source and said energy separating magnet, whereby the solid angle of acceptance of the charged particles entering into said energy separating magnet is increased without altering the features of said energy separating magnet other than displacing its focal surface, and detection means on at least part of said focal line.

3. A high-intensity magnetic energy-spectrum measuring device comprising, in combination with a source of charged particles whoes energy spectrum is to be measured, an energy separating magnet having pole faces separated by a gap, said pole faces having boundaries which lie in a common cylindrical surface in the vicinity of the charged particles being focused such that charged particles entering said gap from a given origin are focused at a focal line the position of which is a function of the energy of the charged particles, and a single sector magnetic lens supported between said source and said energy separating magnet, whereby the solid angle of acceptance of the charged particles entering into said energy separating magnet is increased without altering the features of said energy separating magnet other than displacing its focal surface, and detection means on at least part of said focal line.

References Cited in the file of this patent

Jordan, "A Short History of Isotopes and the Measurement of Their Abundance," Journal of Applied Physics, vol. 13, No. 9, September 1942, pp. 526 to 538.

Courant, "The Strong-Focusing Synchroton—a New High Energy Accelerator," Physical Review, vol. 88, No. 5, Dec. 1, 1952, pp. 1190 to 1196.

Ikegami, "Second-Order Properties of Double-Focusing Spectrometer with Nonuniform Field," The Review of Scientific Instruments, vol. 29, No. 11, November 1958.

Review of Scientific Instruments, April 1959, No. 4, pp. 260–261, article by G. F. Giese on Strong Focusing Ion Source for Mass Spectrometers.